(12) United States Patent
Redler et al.

(10) Patent No.: US 6,897,423 B2
(45) Date of Patent: May 24, 2005

(54) SELF-POWERED INTERMITTENT MOVING LIGHT TRACKING DEVICE AND METHOD

(75) Inventors: Michael H. Redler, 169 Fairfield St., New Haven, CT (US) 06515; Dennis Rader, Woodbridge, CT (US)

(73) Assignee: Michael H. Redler, New Haven, CT (US)

( * ) Notice: Subject to any disclaimer, the term of this patent is extended or adjusted under 35 U.S.C. 154(b) by 7 days.

(21) Appl. No.: 10/294,849

(22) Filed: Nov. 14, 2002

(65) Prior Publication Data

US 2004/0094691 A1 May 20, 2004

(51) Int. Cl.[7] ............................................. G01C 21/02
(52) U.S. Cl. ................................... 250/203.4; 136/246
(58) Field of Search .......................... 250/203.1–203.4; 136/246

(56) References Cited

U.S. PATENT DOCUMENTS

| | | | | |
|---|---|---|---|---|
| 4,469,938 A | * | 9/1984 | Cohen | .................... 250/203.4 |
| 4,883,340 A | * | 11/1989 | Dominguez | ................ 359/593 |
| 5,317,145 A | * | 5/1994 | Corio | ...................... 250/203.4 |
| 5,493,824 A | * | 2/1996 | Webster et al. | ............... 52/200 |
| 6,367,259 B1 | * | 4/2002 | Timm | ....................... 60/641.8 |

* cited by examiner

*Primary Examiner*—Thanh X. Luu
(74) *Attorney, Agent, or Firm*—Wolf, Greenfield & Sacks, P.C.

(57) ABSTRACT

An autonomous light tracking device includes first and second movable light-sensitive sensors that produce respective first and second electrical signals representative of light received from a remote light source, and a first comparator that receives the first and second electrical signals and is adapted to provide a first output signal when the first electrical signal differs substantially from the second electrical signal in a predetermined manner. The autonomous light tracking device also includes a motor coupled to the first and second movable light-sensitive sensors, that selectively moves the first and second movable light-sensitive sensors in response to the first output signal so as to maintain the first and second movable light-sensitive sensors in approximate relative alignment with the remote light source over a substantial arcuate range of motion, and a power supply for the first comparator and the motor, that generates required electrical power from the remote light source.

18 Claims, 12 Drawing Sheets

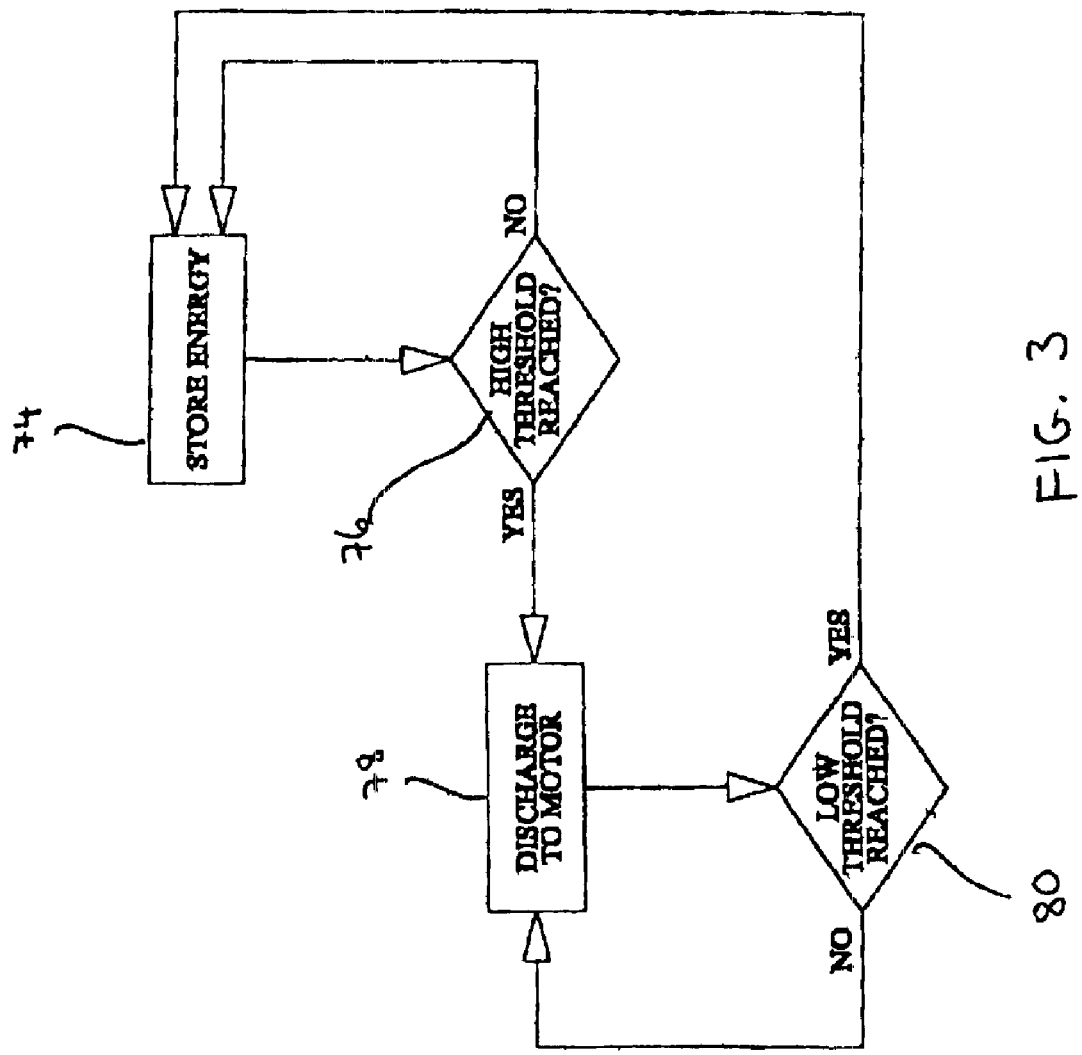

SELF-POWERED INTERMITTENT MOVING LIGHT TRACKING DEVICE AND METHOD

BACKGROUND

1. Field of the Invention

The present invention is directed to a device for tracking moving light sources, such as, but not limited to, a heliostat. More particularly, the invention is directed to a light tracking device that is self-contained and self-powered for operation, for use with or in, for example, solar energy applications.

2. Discussion of Related Art

For some time it has been recognized that solar energy is a desirable source of energy as it is clean, i.e., does not produce any hazardous by-products, is readily available and inexhaustible. However, solar panels and collectors are expensive and, in order to obtain efficient operation, it is desirable to maximize sunlight absorbed by the panels and/or collectors. Therefore, it is necessary to compensate for (i.e., track) the changing direction of the sunlight caused by the sun's apparent motion through the sky, and keep the panels aimed at the sun. This requires a moving light tracking device. One type of such a device is known as a "heliostat." A heliostat is an instrument including a mirror that is automatically moved by a clockwork mechanism so as to reflect sunlight (or light from another bright source) in a fixed direction. Thus, using a heliostat, a beam of sunlight may be steadily directed to one spot during most or all of the whole diurnal period of daylight from the sun. However, in some applications it is not necessary to move a mirror and the object of the tracking device may be to keep solar devices aimed at the sun and use, for example, their electrical output to drive a load (e.g., a radio) directly.

Conventional heliostats are economically and practically unfeasible or undesirable for some applications because they are expensive and include complicated machinery. Conventional heliostats usually include a computer or microprocessor adapted to control the positioning of the heliostat mirror, taking into account the latitude and longitude of the location of the heliostat. Thus, set-up of the heliostat may be an involved process that may include programming the computer with the geographic coordinates of the location of the heliostat. Computers are expensive, adding to the overall cost of conventional heliostats. Known heliostats also require an external power supply, for example a sizeable battery or a.c. mains supply, to power the computer, other electronics, and motor needed to move the mirror and other components of the heliostat to keep the mirror properly aligned with the sun. The external power supply also adds to the cost, bulkiness and weight of conventional heliostats. Due to such cost, bulkiness and weight factors, and sometimes the need for an a.c. mains supply, conventional heliostats are rendered unsuitable for many applications, for example camping or other remote location uses, where the heliostat would need to be portable, or small and light, or preferably inexpensive and easy to set-up.

SUMMARY OF THE INVENTION

According to one embodiment, an autonomous light tracking device may comprise a first, movable light-sensitive sensor that produces a first electrical signal representative of light received from a remote light source, a second, movable light-sensitive sensor that produces a second electrical signal representative of light received from the remote light source, and a first comparator that receives the first and second electrical signals and adapted to provide a first output signal when the first electrical signal differs substantially from the second electrical signal in a predetermined manner. The autonomous light tracking device may further comprise a prime mover (for example, a motor) coupled to the first and second movable light-sensitive sensors, that selectively moves the first and second movable light-sensitive sensors in response to the first output signal so as to maintain the first and second movable light-sensitive sensors in approximate relative alignment with the remote light source over a substantial arcuate range of motion, and a power supply for the first comparator and the prime mover, that generates required electrical power from the remote light source.

According to another embodiment, an autonomous light tracking device constructed to track a position of a sun and to receive operating power from the sun may comprise a plurality of light-sensitive sensors adapted to receive light from the sun and control circuitry, coupled to the plurality of light-sensitive sensors, adapted to generate a control signal representative of light received by at least some of the plurality of light-sensitive sensors. The autonomous light tracking device may further include a moving mechanism that moves at least a movable part of the light tracking device to maintain at least the movable part of the light tracking device in alignment with the sun, means for actuating the moving mechanism in response to the control signal, and at least one photovoltaic cell coupled to the means for actuating the moving mechanism, the at least one photovoltaic cell being adapted to receive light from the sun and provide operating power to the means for actuating the moving mechanism, wherein the means for actuating the moving mechanism is adapted to store energy received from the at least one photovoltaic cell and to allow the moving mechanism to move when a predetermined amount of energy has been stored, such that the moving mechanism exhibits intermittent motion.

In another embodiment, an apparatus may comprise an electric motor, control circuitry coupled to the electric motor, and at least one photovoltaic cell coupled to the control circuitry and adapted to receive light from a remote source and provide operating power to the control circuitry, wherein the control circuitry is adapted to store energy received from the at least one photovoltaic cell and to allow the electric motor to move when a predetermined amount of energy has been stored, such that the electric motor exhibits intermittent motion.

According to yet another embodiment, a method for providing solar energy to a target may comprise acts of receiving light from the sun with a plurality of light-sensitive sensors each adapted to generate an output signal representative of an amount of light received, and generating a control signal based on a comparison of the output signals provided by the plurality of light-sensitive sensors. The method may further include moving at least two movable ones of the plurality of light-sensitive sensors in response to the control signal to maintain the at least two movable light-sensitive sensors in approximate relative alignment with the sun, moving a mirror in response to the control signal to maintain the mirror in approximate alignment with the sun and with the target so that light from the sun is reflected to the target, thereby providing the solar energy to the target, and converting light received from the sun with at least one photovoltaic cell to operating power for performing the moving acts.

BRIEF DESCRIPTION OF THE DRAWINGS

The foregoing and other features and advantages of the present invention will be apparent from the following nonlimiting discussion of various illustrative embodiments and aspects thereof with reference to the accompanying drawings, in which like reference numerals refer to like elements throughout the different figures. The drawings are provided for the purposes of illustration and explanation, and are not intended as a definition of the limits of the invention. In the drawings.

FIG. 3 is a flow diagram of one example of a method for powering a motor according to aspects of the invention;

DETAILED DESCRIPTION

Figure 1:
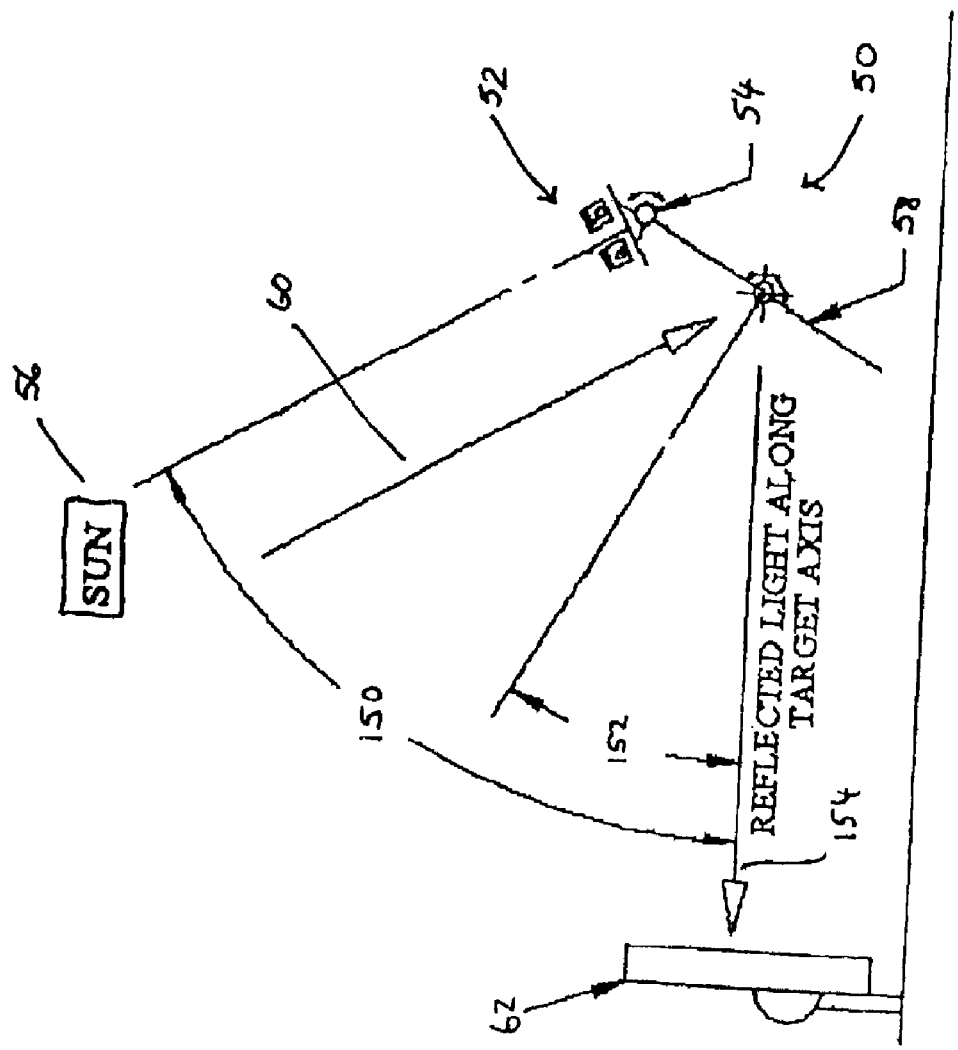
FIG. 1 is a schematic block diagram of a portion of one embodiment of an autonomous light tracking device according to aspects of the invention.

Various illustrative embodiments and examples of a light tracking device and control circuitry according to aspects of the invention will now be described in more detail. It is to be appreciated that the term "light tracking device" as used herein refers to a device capable of tracking a remote light source, such as, for example, the sun, and that the device may or may not include a mirror, as will be illustrated in the various embodiments described below. Additionally, the term "autonomous" as used herein describes the fact that the device does not require any outside power supply other than the remote light source that the device is tracking. It is to be understood that the invention is not limited in its application to the details of construction and the arrangement of components set forth in the following description or illustrated in the drawings. Other embodiments and manners of carrying out the invention are possible. Also, it is further to be understood that the phraseology and terminology used herein is for the purpose of description and should not be regarded as limiting. The use of "including," "comprising," or "having" and variations thereof is meant to encompass the items listed thereafter and equivalents thereof as well as additional items.

Referring to FIG. 1, there is illustrated a schematic block diagram of portions of one embodiment of an autonomous light tracking device according to certain aspects of the invention. The light tracking device 50 includes a sensor array, including at least one pair of movable light-sensitive sensors 52, and a moving mechanism 54, that may include, for example, a motor, that enables the pair of movable sensors 52 to move so as to be maintained in approximate alignment with a remote light source, for example, the sun 56. It is to be appreciated that although this and other embodiments of the light tracking device may be described in terms of tracking the sun, the light tracking device is not so limited, and may be adapted to track a remote light source other than the sun. Furthermore, movement of the remote light source may not be assumed a priori, and need not progress uniformly or in a single direction, just slowly enough for the apparatus to track it.

According to another embodiment, the light tracking device 50 may further include a mirror 58 that may be coupled to the sensor array and to the motor and control circuitry such that the mirror can be maintained in approximate alignment with the sun. In this example, the light tracking device may act as a heliostat, and may use the mirror to reflect incident radiation 60 from the sun to concentrate the radiation onto a target 62 such as, for example, a passive solar collector or a solar panel comprising an array of photovoltaic cells. The light tracking device may be constructed to adjust to the orientation of the sun (i.e., track the sun's position in the sky) so as to continuously maintain reflected solar energy on the target as long as sunlight is available. However, the target 62 need not be remote from the light-tracking device, but may be directly mounted to the light tracking device, in which case there may be no need for the mirror 58, as will be discussed below. It is to be appreciated that although the following discussion may refer primarily to a "solar panel," i.e., an array of photovoltaic cells that convert received light into electrical energy, being used as the target 62, the invention is not so limited, and a passive solar collector (such as, for example, a set of fluid-filled coiled tubes that form an integral part of a closed loop of circulating fluid, that absorbs thermal energy from the sun and is connected to a thermal exchange device) may also be used, particularly where the target 62 is remote from the light-tracking device. Each of the parts of the light tracking device 50, and its operation, will be discussed in more detail below.

Conventional heliostats may require a computer and complex set-up procedure to determine orientation of the light tracking device to the sun, depending on the latitude and longitude of the location of the light tracking device. According to one embodiment, an autonomous light tracking device of the present invention may use two axes of alignment that are independent of latitude and/or longitude, thereby simplifying the set-up procedure. Furthermore, because the light tracking device may direct light to the target (be it remote or mounted to the light-tracking device) from any orientation, it may become difficult to associate one plane or axis of motion of the light tracking device with either azimuth or zenith. Therefore, an angular position of the sun may be tracked with respect to each of two control axes of the light tracking device.

Figure 2:
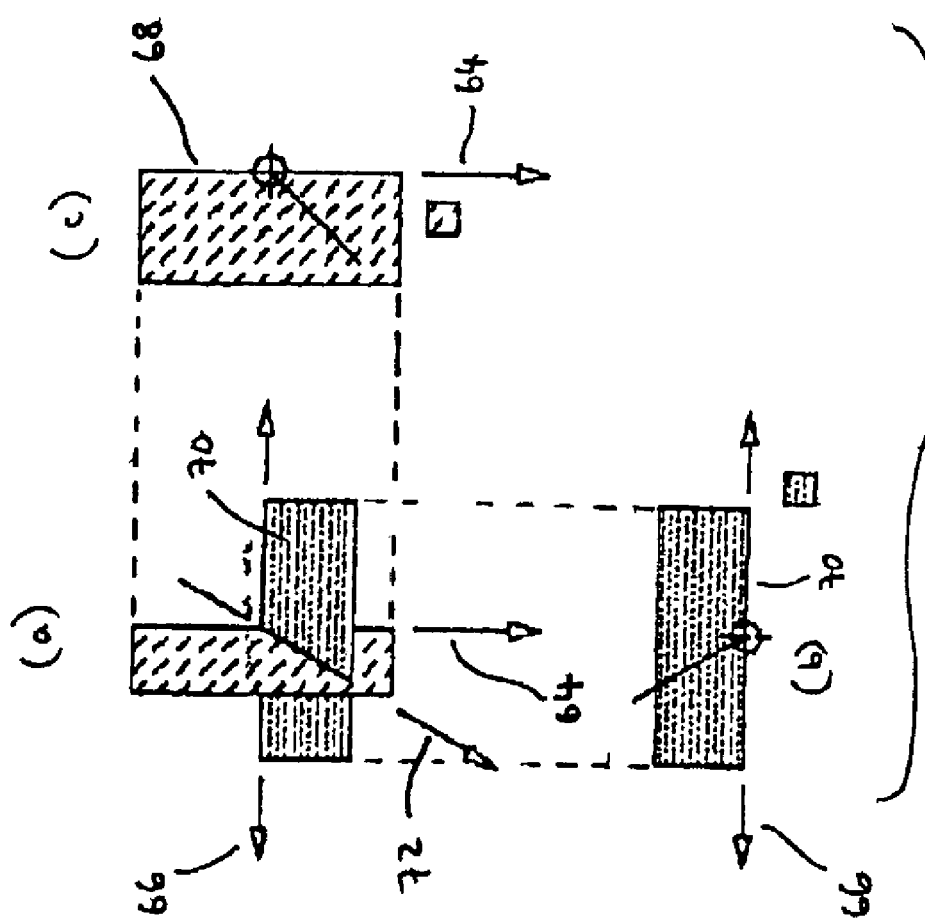
FIG. 2 is an illustration of the planes of alignment of the light tracking device.

Referring to FIG. 2, a first axis that passes through the target and is used to aim reflected light at the target may be defined as a target axis 64. The target axis 64 is illustrated in views (a) and (c) of FIG. 2. A second axis that exists at an angle normal to the target axis may be defined as the elevation axis 66. Although this axis may not measure an elevation angle with respect to any horizon, it measures the angle of elevation with respect to a plane of the target axis.

The elevation axis 66 is illustrated in views (a) and (b) of FIG. 2. Thus, there may be two axes and two corresponding planes, namely the target plane 68 and elevation plane 70 used to align the mirror such that sunlight is reflected to the target. An intersection of the two planes produces a theoretical line 72 pointing directly toward the sun, as shown in view (a) of FIG. 2.

Figure 6:
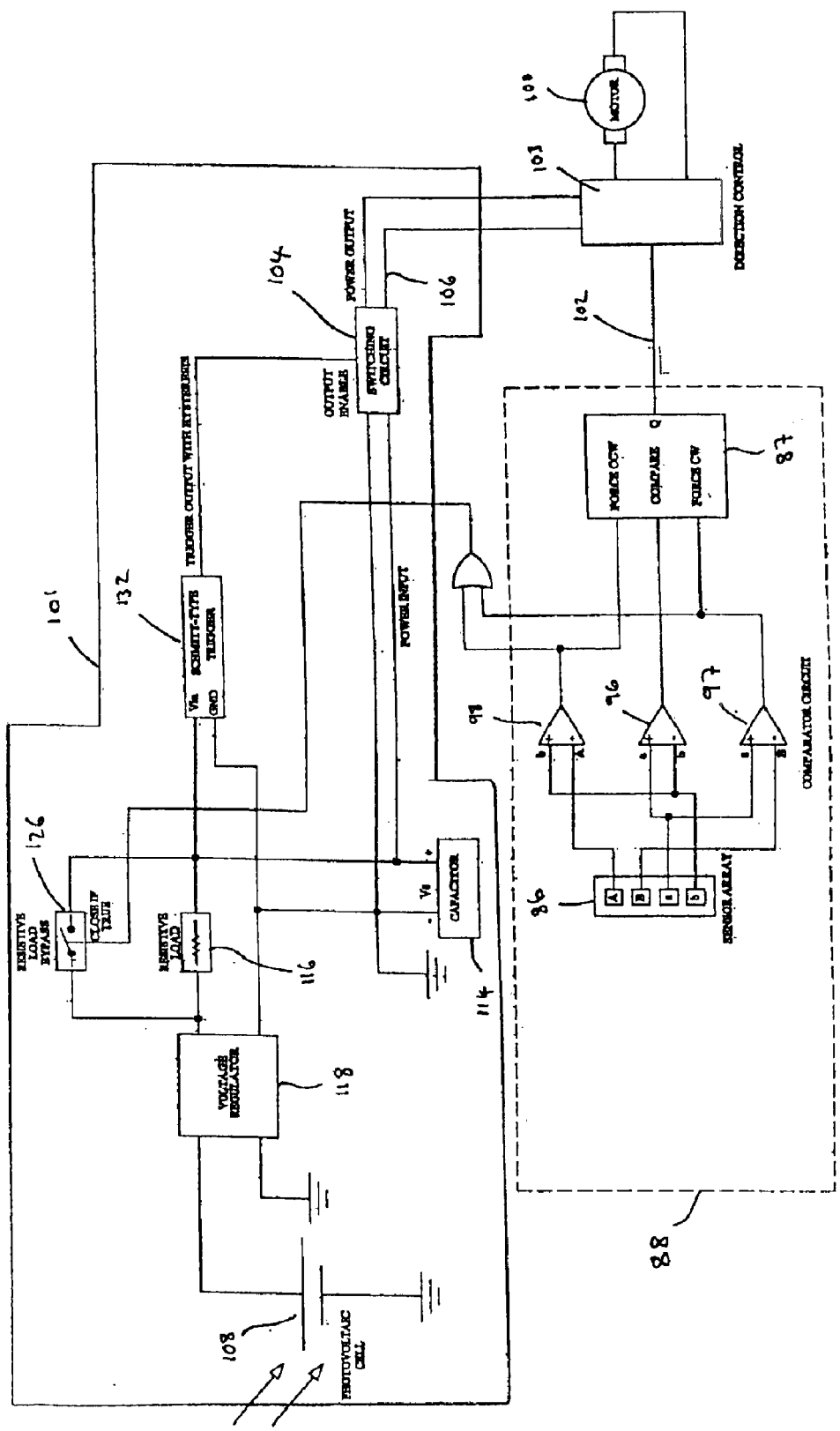
FIG. 6 is a block diagram of one example of light tracking device circuitry according to aspects of the invention.
Figure 7:
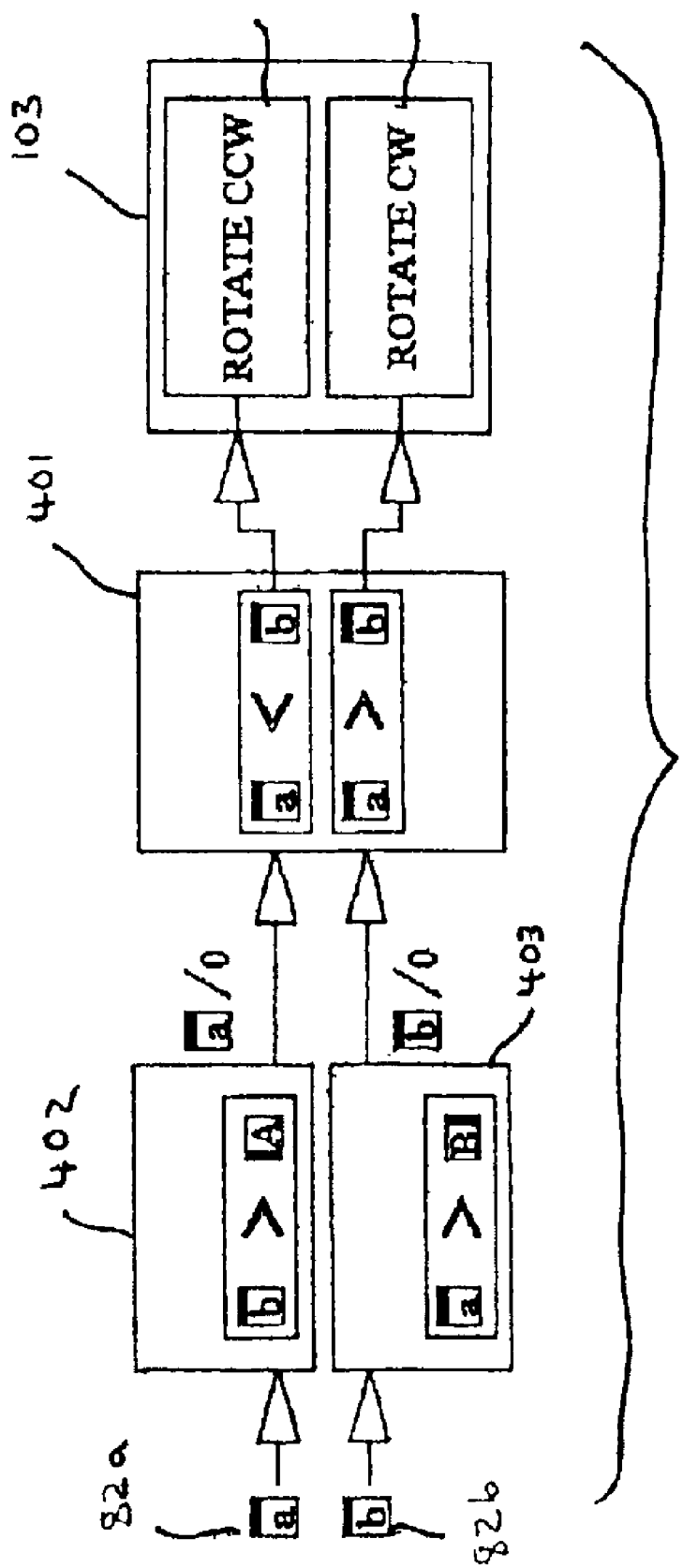
FIG. 7 is a truth table illustrating another example of direction control circuitry according to aspects of the invention.

According to one embodiment, illustrated in block diagram form in FIG. 6, the light tracking device may include an electric motor 100 for each axis of alignment, and control circuitry 101 by which the motors 100 transfer their output to movement of the light tracking device. The control circuitry may be considered a means for actuating the motors 100. The control circuitry 101 includes one or more photovoltaic cells 108 that convert solar energy from the sun into electrical energy, and drive circuitry that uses the electrical energy provided by the photovoltaic cells 108 to power the electric motors. The components of the control circuitry 101 will be described in more detail below. In one example, the light tracking device may make use of the fact that the sun moves slowly from horizon to horizon, and make small, intermittent movements to adjust the position of parts of the sensor array and the mirror. There are two particular advantages to controlling the motor by using intermittent motion. First, the photovoltaic cells used to supply operating power to the motors may be significantly smaller than would be required were the motor to operate continuously. This may reduce the cost of the light tracking device. Second, intermittent motion may make alignment overshoot easier to control should the system be underdamped, because the motor will make only a small movement each cycle and thus any overshoot will be very small.

Referring to FIG. 3, there is illustrated a flow diagram of one example of a method for powering the electric motors. The corresponding circuit elements referred to are illustrated in FIG. 6. The photovoltaic cells 108 produce a current representative of sunlight received by the photovoltaic cells 108. In a first step 74, current from the photovoltaic cells 108, and thus electrical energy, is stored by a storage device, such as, for example, a capacitor 114, that is coupled to the photovoltaic cells 108. The storage device may continue to store electrical energy until a predetermined high threshold energy level (represented, for example, by voltage across the capacitor 114) is reached, as shown in step 76. Once the high threshold has been reached, power is discharged, in step 78, from the storage device to necessary parts of the control circuitry to allow one or both of the electric motors to rotate in an appropriate direction. The motors and control circuitry may continue to function until a predetermined amount of energy has been discharged such that a low threshold value in the storage device is reached. At this time, current to the motor may be shut off and the storing cycle begins again, as shown by step 80 in FIG. 3.

The cycle illustrated in FIG. 3 results in a series of small intermittent motions of the motor, and thus the movable parts of the light tracking device driven by the motor, not unlike a conventional clock mechanism. When the current supplied by the photovoltaic cells ceases, or falls to a low value, due to, for example, cloud cover or sunset, the system may stop until the sun reappears. The system then acquires the new position of the sun, as will be explained in more detail below, and adjusts the orientation of the sensor array and mirror accordingly. The control circuitry and cycle here described may prevent the motor from rotating unless sufficient energy is available so that the motor may operate at full torque. In other words, the storage cycle continues until the predetermined high threshold, which may be chosen to correspond to the energy required to drive the motor at full torque, is reached, and rotation of the motor does not occur until the storage cycle is complete. This prevents the motor from rotating at less than full torque, or when less than a predetermined amount of energy is available. This, in turn, prevents the motor from rotating in response to a transient bright light, for example, a headlight beam from a passing car, during conditions when very little or no sunlight is available, for example, at night, or on a very cloudy day. This may be advantageous because it prevents the system from responding to transient light sources, and thereby becoming misaligned and wasting energy in unproductive movement. The electric motors in combination with the control circuitry may be considered as a prime mover for the movable parts of the light-tracking device.

According to one embodiment, the light tracking device includes direction control circuitry for each axis of alignment of the light tracking device. Referring to FIGS. 4a–d, the direction control circuitry includes the sensor array mentioned previously, which may include, for each axis of alignment, a pair of movable light-sensitive sensors 82a and 82b, and a pair of fixed light-sensitive sensors 92a and 92b. However, it is to be appreciated that the sensor array may include any number of additional movable light-sensitive sensors and may include more than two fixed light-sensitive sensors. In addition, each pair of light sensitive sensors is not limited to consisting of two individual sensors, but may include, for example, two groups of a plurality of sensors. Each of the light sensitive sensors (movable and/or fixed) generates an electrical signal representative of an amount of light received by the sensor. In one example, a narrow barrier 84 may separate a first sensor 82a and a second sensor 82b of the pair of movable light-sensitive sensors, the barrier 84 defining a centerline for the pair of movable light-sensitive sensors, as shown in FIGS. 4a–d. When the centerline is not in approximate alignment with the sun, the barrier 84 may cast a shadow onto one or the other of the first sensor 82a and the second sensor 82b. Thus, the electrical signal generated by the sensor in shadow may differ from the electrical signal generated by the sensor not in shadow because the amount of light received by each sensor is different. When the electrical signals generated by the sensors 82a and 82b are approximately equal, the barrier 84 may be assumed to be in approximate alignment with the sun.

Figure 5:
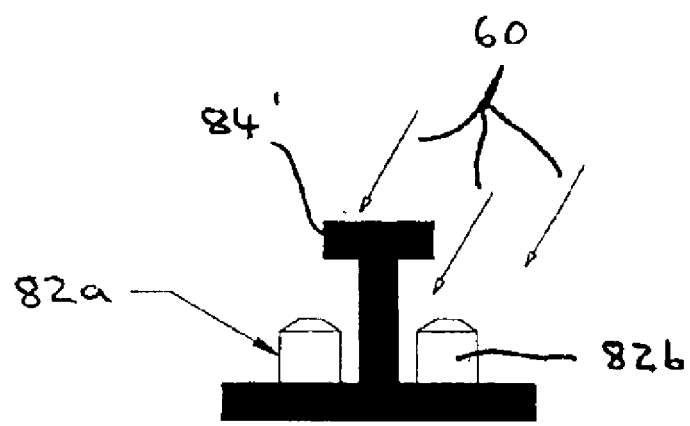
FIG. 5 is a schematic diagram of another example of a configuration of a portion of a sensor array.

According to another example, the barrier 84 may be a T-shaped barrier 84', as illustrated in FIG. 5. In this example, in some configurations, a shadow may be cast onto both the sensors 82a, 82b by the barrier 84'. However, when the centerline is not in approximate alignment with the sun, the barrier 84' casts a more extensive shadow onto one or the other of the first and second sensors 82a, 82b, for example onto the first sensor 82a as illustrated. Thus, because the extent of the shadow differs between sensors, the electrical signals generated by the sensors will also be different, and the system operates substantially as described above.

Referring to FIG. 6, the movable and fixed sensors (providing a first sensor array 86 for the first axis of alignment) are coupled to a comparison circuit 88. The comparison circuit 88 compares the electrical signals generated by the first and second movable light-sensitive sensors 82a and 82b, and provides a control signal on line 102, that is passed to motor direction control circuitry 103. The motor direction control circuitry 103 receives a signal from the control circuitry 101 and causes the motor to rotate in an appropriate direction to bring the centerline into approximate alignment with the sun, i.e., to remove the shadow. In one example, the direction control circuitry 103 may be considered as a means for actuating the moving mechanism that may include the electric motor. In another example, the comparison circuit 88 may include a first comparator 96 that may compare values of the electrical signals generated by the first and second movable light-sensitive sensors 82a and 82b, to provide a first output signal. Thus for example, referring again to FIG. 4a, the shadow cast by the barrier 84 may fall on the first movable light-sensitive sensor 82a, and the first output signal from the first comparator may indicate that the motor should rotate in the clockwise (CW) direction to remove the shadow from the first movable light-sensitive sensor and approximately align the light tracking device with the sun.

Figure 4A:
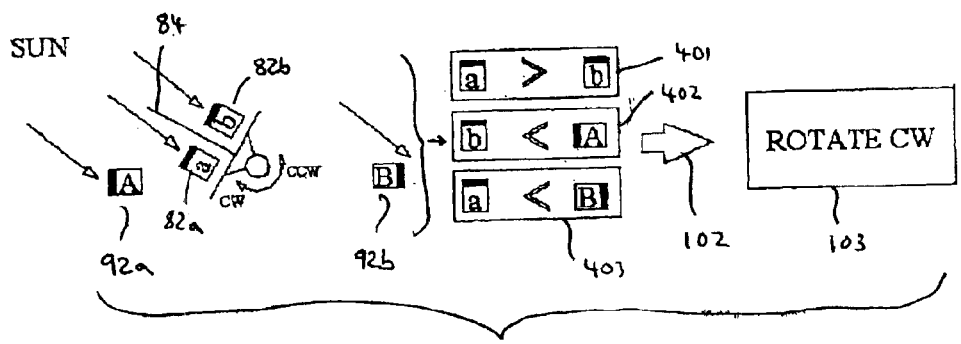
FIGS. 4a–d are schematic block diagrams of examples of configurations of an example of a sensor array for one axis of alignment of the light tracking device according to aspects of the invention.

As shown in FIG. 4a, and referring also to FIG. 6, signals generated by the sensors (fixed and movable) are provided to the comparison circuit 88 which performs three steps of comparison—step 401 wherein the signals generated by each of the movable sensors 82a and 82b are compared, step 402 wherein the signal from the second movable sensor 82b is compared with the signal from the first fixed sensor 92a, and a third step 403 wherein the signal from the first movable sensor 82a is compared with the signal from the second fixed sensor 92b. A signal representative of the results of the comparisons is provided on line 102 to direction control circuitry 103 that causes the motor 100 to rotate in an appropriate direction.

In one example, each of the first and second movable light-sensitive sensors generates a signal that have an amplitude representative of the amount of light received by the sensors, and the respective amplitudes may be compared by the first comparator. Then, if for example, the shadow cast by the barrier 84 falls on the first movable light-sensitive sensor 82a, as shown in FIG. 4a, the amplitude of the electrical signal produced by the first movable light-sensitive sensor 82a may be larger than an amplitude of the electrical signal generated by the second movable light-sensitive sensor 82b if the sensors are of a type where the signal amplitude decreases with an increasing amount of received light. Alternatively, the amplitude of the electrical signals generated by the sensors may increase with an increasing amount of received light. In yet another example, a phase of the electrical signals generated by the sensors may vary depending on the amount of light received by the sensors, and the first comparator may be a phase comparator. It is thus to be understood that the comparator circuit is not limited to comparing amplitudes of the electrical signals generated by the sensors. Although the following discussion will assume that the sensors produce smaller amplitude signals in response to more received light, there may be many alternative situations contemplated by those of skill in the art, all of which are intended to be considered part of this disclosure. Furthermore, although the embodiments described herein include a barrier located between the first and second movable light-sensitive sensors of each pair of movable light-sensitive sensors, the invention is also not limited in this regard, and as an alternative to the barrier, the first and second sensors may have a limited field of view such that each sensor may only receive light when in, or near, approximate alignment with the sun. In this example, there may be a plurality of movable sensors, not only a pair, each one of the plurality of sensors having a predetermined limited field of view and being located adjacent another one, such that an approximate position of the sun may be determined from a comparison of the signals generated by each of the plurality of movable sensors.

Figure 4B:
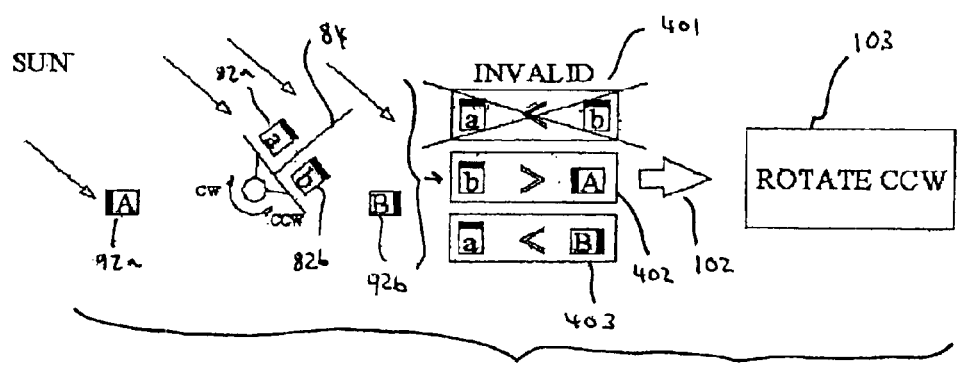
Figure 4C:
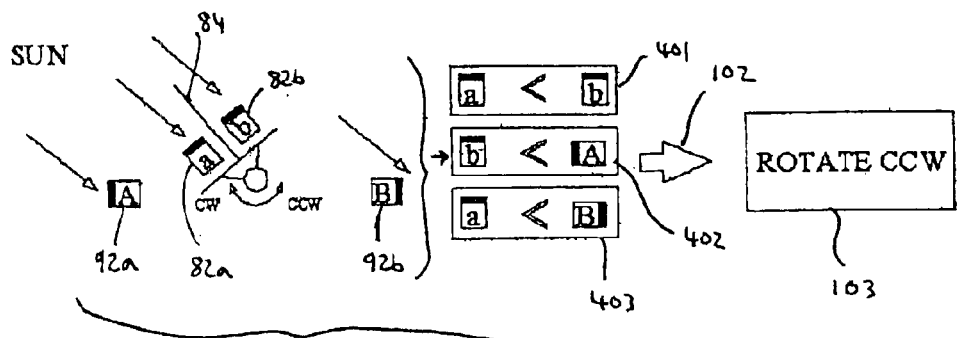
Figure 4D:
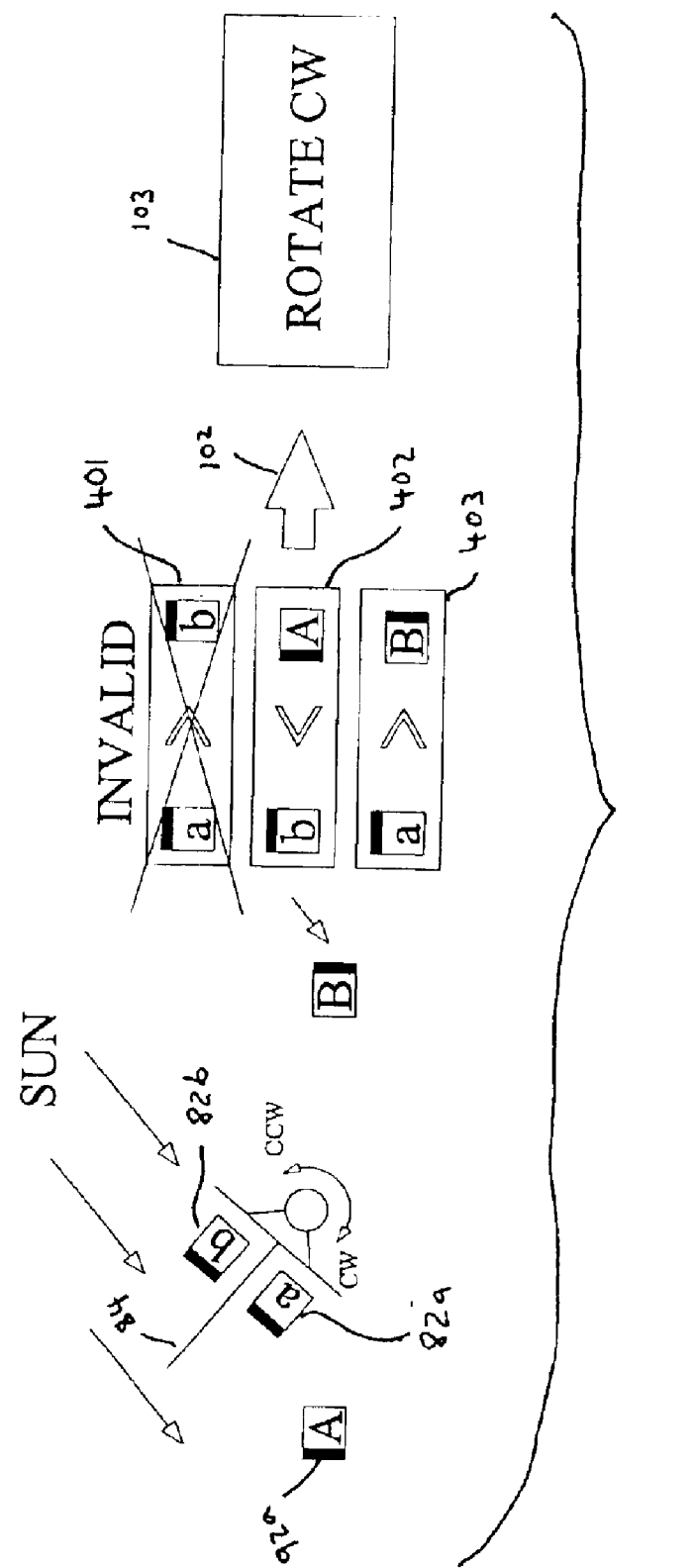

As mentioned above, the first sensor array may also include a pair of fixed sensors 92a and 92b. According to one example, the pair of fixed sensors may be positioned such that a first fixed sensor 92a faces toward a first horizon, and a second fixed sensor 92b faces toward a second horizon and away from the first fixed sensor 92a. For example, the first fixed sensor 92a may face toward an Eastern horizon, and the second fixed sensor 92b may face toward a Western horizon. If, for example, the pair of movable light-sensitive sensors is facing away from the sun, as shown in FIG. 4b, an invalid comparison of the signals generated by the two movable sensors 82a and 82b (step 401) may result, i.e., the comparison may suggest that the motor rotate in an incorrect direction, because neither movable sensor may be receiving direct sunlight. The fixed sensor pair may then determine to which horizon the sun may appear closer, and override the result of the comparison of the pair of movable sensors.

For example, referring to FIG. 4b and FIG. 6, a second comparator may compare values of the electrical signals generated by the second movable light-sensitive sensor 82b and the first fixed light-sensitive sensor 92a (step 402) to generate a second output signal. Similarly, a third comparator 97 may compare the signals generated by the first movable light-sensitive sensor 82a and the second fixed light-sensitive sensor 92b (step 403) to generate a third output signal. Referring to FIG. 4b, if for example, the centerline is facing away from the sun, the second output signal (from the second comparator) may indicate that the second movable light-sensitive sensor 82b may be receiving less light than the first fixed sensor 92a, (step 402) and similarly that the first movable light-sensitive sensor 82a may be receiving more light than the second fixed sensor 92b (step 403). Thus, a combination of the three comparisons indicates that a correct direction in which the motor should rotate may be counterclockwise (CCW), to move the centerline into approximate alignment with the sun. Thus, the control signal generated by the comparator circuit on line 102 may cause the motor to rotate CCW.

According to one embodiment, the circuitry may initially compare the signals generated by each of the movable light-sensors 82a and 82b, representative of the amount of light received by each movable light-sensitive sensor. As discussed above, by comparing the signals generated by each of the movable light-sensitive sensors 82a, 82b with a corresponding one of the signals generated by the fixed light-sensitive sensors 92b and 92a, a second and a third comparator compares the amount of light received by the movable sensors with the amount of light received by the fixed sensors. When both movable light-sensitive sensors 82a and 82b receives more light than either of the fixed light-sensitive sensors 92a, 92b, which may correspond, for example, to the configurations illustrated in FIGS. 4a and 4c, the second and third comparisons have no effect on the motor direction, and the device continues to track the sun in a usual manner. If, for example, the second movable light-sensitive sensor 82b is exposed to less light than the first fixed light-sensitive sensor 92a, (see FIG. 4b), the signal generated by the second comparator causes the first movable light-sensitive sensor 82a to appear as though it were completely saturated with light from the remote light source. (see FIG. 6 the second comparator 98 provides a signal to the force CCW input of circuitry 87). This, in turn, causes the first comparator to accordingly generate a signal indicating that the first movable light-sensitive sensor 82a is receiving more light that the second movable light-sensitive sensor 82b, and thus the control signal that may be produced by the comparator circuit as a result causes the motor to rotate CCW, which would be the correct direction. Referring to FIG. 6, when the above-described situation occurs, the circuitry 87 may override the signal generated by the first movable light-sensitive sensor 82a, i.e. the second comparator causes a null input to the first comparator 96 instead of the value of the signal from the first movable light-sensitive sensor 82a. Thus, the first comparator may perform a comparison of the value of the signal generated by the second movable light-sensitive sensor 82b and a null signal, and accordingly generates a control signal indicating that the motor should rotate CCW, as illustrated in FIG. 4b. Similarly, if the first movable light-sensitive sensor 82a receives less light than the second fixed light-sensitive sensor 92b, which may correspond to the configuration illustrated in FIG. 4d, the circuitry 87 produces a control signal that causes the motor to rotate CW, which would be the correct direction according to the configuration illustrated in FIG. 4d.

Therefore, the first and second fixed sensors, and second and third comparators act to intervene under conditions where the movable light-sensitive sensors, and thus the centerline, are substantially misaligned with the sun, (as may occur at sunrise, or after a very overcast spell). This prevents the device from moving randomly in response to other minor light sources, and failing to become properly re-aligned with the sun after a substantial misalignment has occurred.

Figure 8:
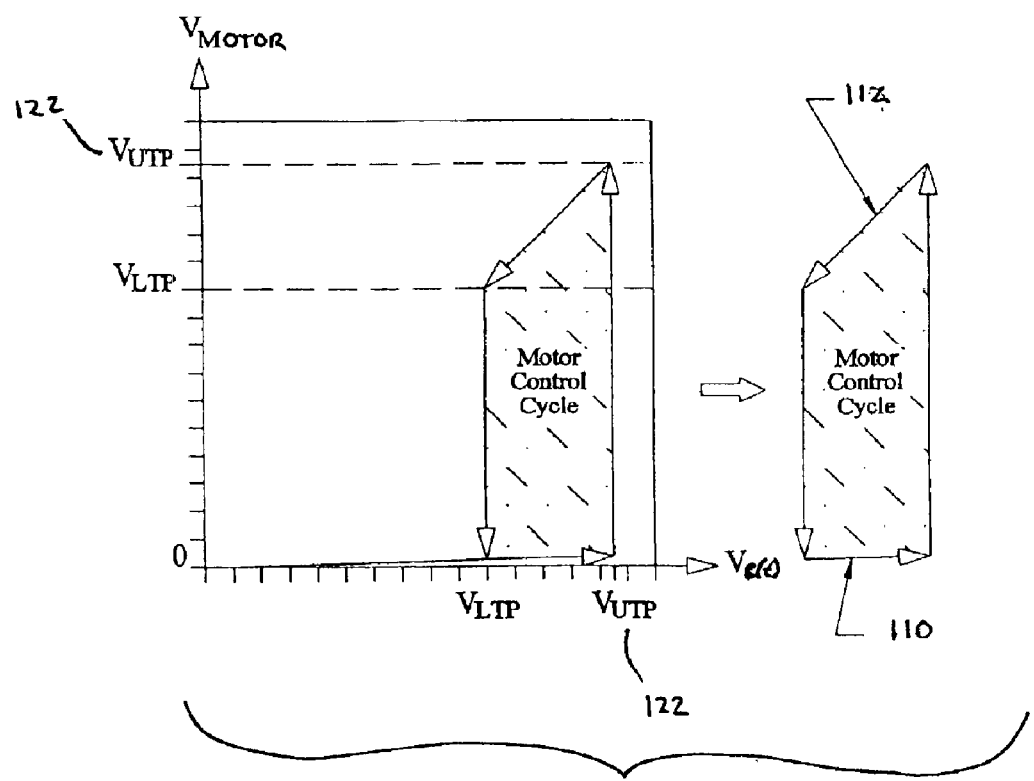
FIG. 8 is a graph illustrating an example of a storage portion of the drive cycle for, the motors according to aspects of the invention.
Figure 9:
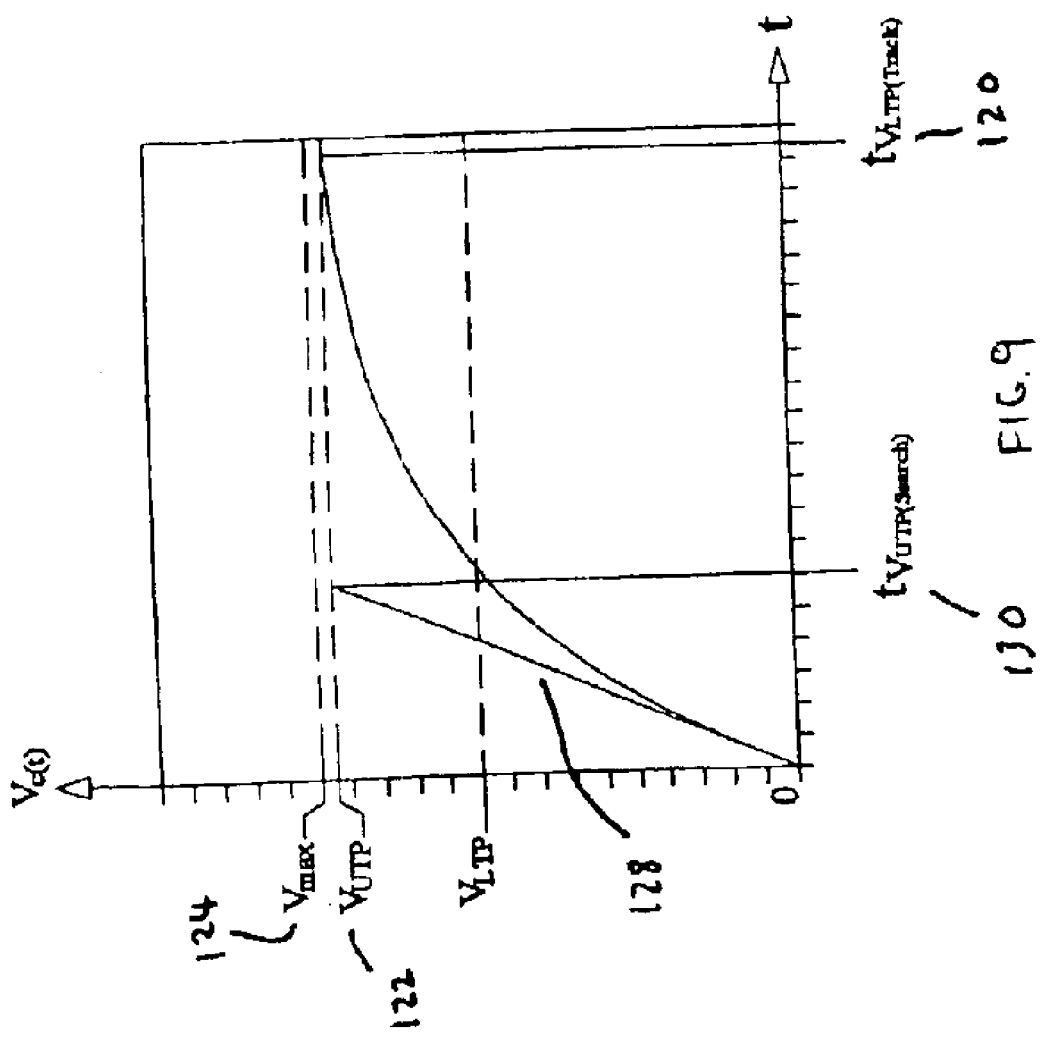
FIG. 9 is a graph illustrating an example of a voltage across the capacitor over time.

According to another embodiment, the control circuitry for the motors may include a search mode and a track mode. Referring to FIG. 6, the light tracking device control circuitry may include a switching circuit 126 that switches the control circuitry for the motors 100 between the search and track modes. As discussed above, in one example, the motors may be driven according to the steps illustrated in FIG. 3, such that the motors exhibit intermittent motion. As shown in FIG. 8, the drive cycle for the motors includes a storage portion 110 and a discharge portion 112, as shown. During the storage portion of the cycle, energy from the photovoltaic cell 108 (see FIG. 6) is stored by capacitor 114, as discussed previously. A voltage regulator 118 may also be provided to set an upper limit to the voltage that may be produced across the capacitor 114. When the mechanism is in track mode, the capacitor 114 receives current from the photovoltaic cell 108 via a resistive load 116. Thus, the voltage across the capacitor increases during the storage portion of the cycle according to the curve illustrated in FIG. 9. A first time period 120 is the amount of time taken to charge the capacitor to a predetermined upper threshold value 122, as discussed above. The first time period 120 determines a frequency of the drive cycle, i.e., how frequently the motor 100 rotates. As shown in FIG. 9, the capacitor charges more and more slowly as the voltage across the capacitor approaches the regulator voltage 124. By setting the upper threshold value 122 close to the regulator voltage 124, the first time period 120 may be made relatively long. The first time period 120 may further be controlled during track mode by choosing a value of the resistive load 116 to control the speed at which the capacitor charges. A larger value of the resistive load 116 increases the first time period 120. In one example, the value of the resistive load 116 may be chosen based on a known speed at which the sun moves across the sky, so that the intermittent movements of the motor may accurately track the position of the sun in the sky. It may also be important to correctly scale the amount of rotation per cycle because too much movement per cycle may adversely affect accuracy of the system and ability to effectively track the sun.

In some examples, the light tracking device may become oriented such that it is facing away from the sun, as illustrated in FIG. 4b. In particular, this may often occur in the morning because, if the light tracking device were correctly tracking the sun during the previous day, when the sun sets in the evening, the light tracking device will be facing toward the Western horizon. The following morning, the sun will rise in the East, and thus the light tracking device is facing in a wrong direction for tracking the sun. The sensor array and direction control circuitry indicate that this situation has occurred, generating a control signal that causes the motor to rotate so as to bring the centerline into approximate alignment with the sun. In this case, the motor may need to rotate more than may usually be required in track mode, because the centerline is further than usual out of alignment. Thus, the switching circuit 126 switches the control circuitry into search mode.

Referring again to FIGS. 6 and 9, when in search mode, the resistive load 116 is bypassed by a bypass circuit 126, which may be, for example, a switch, such that the value of the resistive load effectively becomes zero. Thus, the capacitor 114 charges significantly faster than when it charges through the resistive load 116 during track mode, as indicated by line 128 in FIG. 9. The second time period 130, which is the time taken to charge the capacitor to the upper threshold value 122 during search mode, may be determined primarily by the photovoltaic cell 108. The voltage regulator 118 prevents the voltage across the capacitor from rising above a specified voltage for the motors, substantially equal to the regulator voltage 124.

As shown in FIG. 8, the motor drive cycle also includes a discharge portion 112, where the stored energy in the capacitor is discharged to the motor and control circuitry. It should be noted that during the discharge portion of the cycle, current may still flow from the photovoltaic cell 108 to the capacitor 114. The amount of current may be negligible during track mode. However, during search mode, when the resistive load is bypassed, the amount of current flowing to capacitor 114 is limited only by the capacity of the photovoltaic cell 108 and the voltage limitation of the voltage regulator 118. Therefore, it may be possible for the photovoltaic cell 108 to provide more energy to the capacitor 114 than is drawn by the motor 100 during the discharge portion of the cycle. If this occurs, the motor 100 does not exhibit intermittent motion, but rather runs continuously because the low threshold may not be reached as there is always sufficient current available to run the motor 100. It is only when the photovoltaic cell 108 cannot maintain continuous power to the motor 100 that the low threshold value may be reached and the motor 100 is shut off. In one example, the control circuitry may include a current limiting device that limits the amount of current supplied to the storage device and thus prevents the motor 100 from potentially operating continuously rather than intermittently. One consideration in selecting a photovoltaic cell and motors when constructing the light tracking device may be the power requirement of the motors and the average output power of the photovoltaic cell. Furthermore, in search mode, an important criterion may be how quickly the light tracking device can become oriented with the sun, and it may therefore be desirable to select a photovoltaic cell that may be able to provide adequate power such that it may be possible for the motor to run continuously when the system is in search mode. However, it may also be desirable to select a photovoltaic cell that may not be able to exceed the upper threshold value during heavy overcast conditions when no significant sunlight is available, as the system will then likely run continuously even in track mode.

Figure 10:
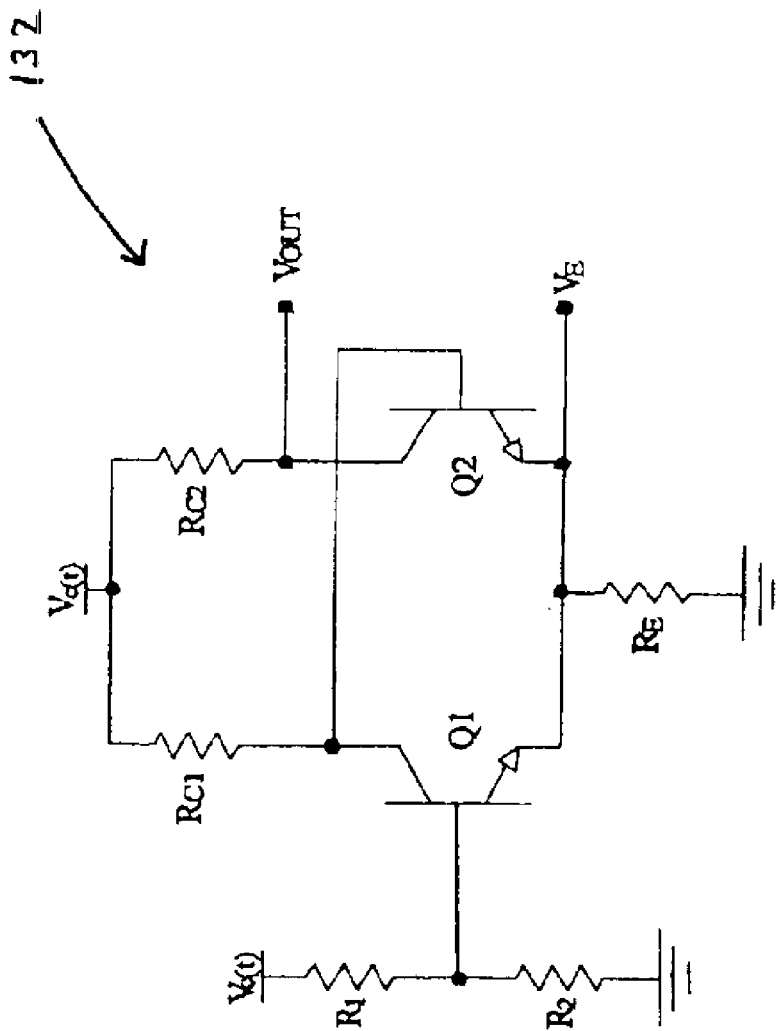
FIG. 10 is a circuit diagram of one example of a circuit that may be used to implement a triggering device.
Figure 11:
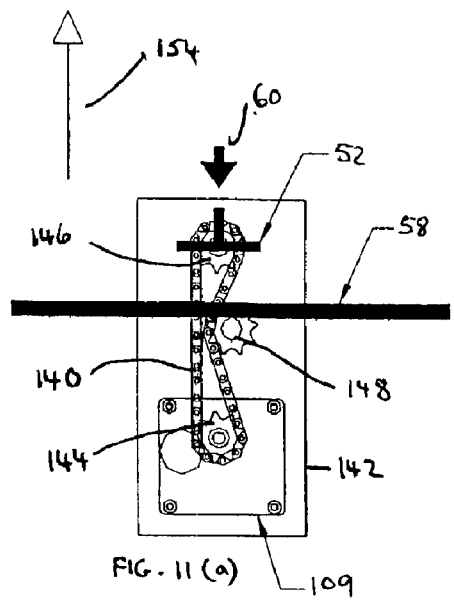
FIGS. 11a–d are schematic diagrams illustrating one example of a mechanical actuating structure for moving parts of the light-tracking device.
Figure 11:
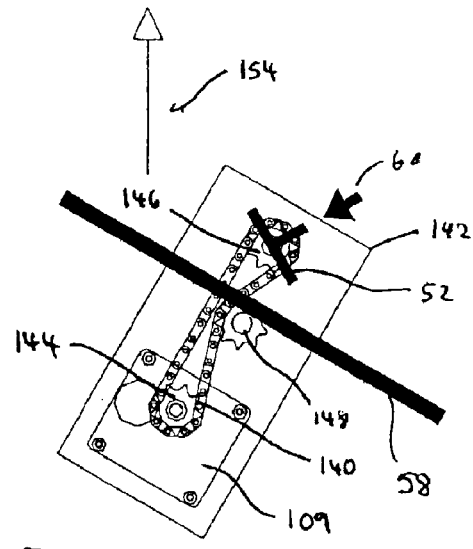
Figure 11:
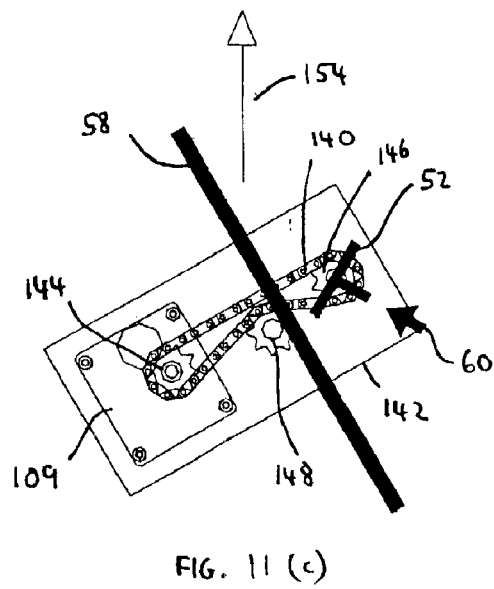
Figure 11:
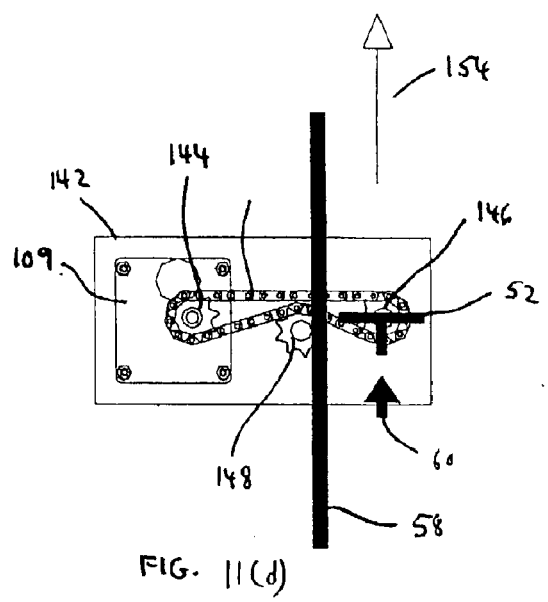

Referring to FIG. 10, there is illustrated one example of a trigger circuit 132 (see FIG. 6) that may be used to control when the drive cycle switches between the storage portion and the discharge portion. It is to be appreciated however, that the circuit illustrated in FIG. 10, which uses a conventional arrangement of transistors as known to those of skill in the art, is one example, and that many variations and alternative circuits may be used. Modifications and alternatives are intended to be covered by this disclosure, provided only that the trigger circuit cause the drive cycle to switch from the storage portion to the discharge portion when the upper threshold is reached, and from the discharge portion to the storage portion when the lower threshold is reached.

According to another embodiment, the motor 100 may be coupled to a mechanical actuating structure that effects rotation of the movable sensors and, optionally, the mirror in response to rotation of the motor 100. FIGS. 11*a–d* illustrate an example of a mechanical actuating structure including a chain 140 coupled to a plurality of spaced apart sprockets 144, 146, 148, which may be mounted to a base structure 142. The sprocket 148 is a stationary sprocket, about which the entire mechanism rotates, as is discussed below. The motor may be mounted to a motor assembly 109 that is coupled to a first sprocket 144. Rotation of the motor, and thus the motor assembly 109, causes rotation of the first sprocket 144 and movement of the chain 140. This in turn causes the entire base structure 142 to rotate or "climb" about the stationary sprocket 148. The mirror 58 is mounted to the base structure 142, and thus rotates about the stationary sprocket 148. The sensor array is also mounted to the base structure 142, and thus also rotates about the stationary sprocket 148. The sensor array 52 is also coupled to another sprocket 146 which is, in turn, coupled to the first sprocket 144 by means of the chain 140. Thus, rotation of the first sprocket 144 is translated through the chain 140 to cause corresponding rotation of the second sprocket 146 and thus the sensor array 52.

Therefore, the sensor array is rotating (at the same rate) upon a rotating base structure, which creates a half-angle motion of the mirror relative to the sensor array, i.e., because the sensor array is rotating on a rotating structure, the net rotation of the sensor array is double that of the mirror.

Thus, referring to FIG. 1, when the sensor array rotates by an angle 150, the mirror may rotate by an angle 152 that may be equal to half the angle 150. In this manner, incident light 60 may be reflected by the mirror, providing reflected light 154 always in the same direction along the target axis and toward the target, regardless of the position of the sun in the sky. This is illustrated in FIGS. 11*a–d*, where the sensor array 52 and mirror 58 are shown in a variety of different positions, but the reflected light 154 is always reflected in the same direction, as indicated by the arrow 154. This result is achieved through the law of reflection which states that the angle of incidence (direction in which the sensor array is pointing when aligned with the sun) must equal the angle of reflection (direction of reflected light 154). Therefore, as shown in FIG. 1, when the mirror 58 is maintained at an angle 152 relative to the sensor array, the reflected light 154 is always reflected to the target 62.

Figure 12:
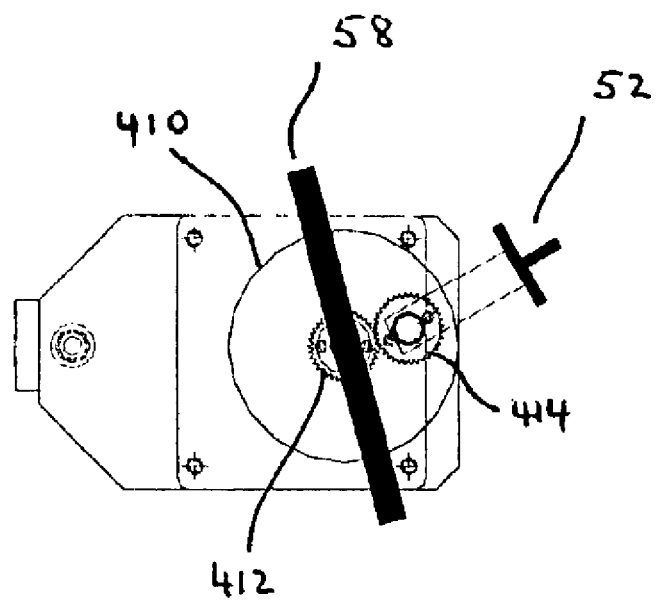
FIG. 12 is a schematic diagram illustrating another example of a mechanical actuating structure for moving parts of the light-tracking device.

Referring to FIG. 12, there is illustrated another example of a "half-angle" mechanical actuating structure that effects rotation of the movable sensors and mirror. In this example, the mirror 58 may be mounted to an assembly 410 that, in response to rotation of the motor, rotates about a stationary gear 412. The sensor array 52 is also mounted to the assembly 410, and thus also rotates with the mirror. The sensor array 52 is also coupled to a second gear 414 that rotates about the stationary gear 412. Therefore, as in the example above, the sensor array is rotating upon a rotating assembly, and thus angular movement of the sensor array 52 is doubled with respect to angular movement of the mirror. It is to be appreciated that the invention is not limited to the chain and sprocket or dual-gear mechanical actuating systems described above, but may instead employ a plurality of coupled gears, for example, similar to a clock mechanism, or another mechanical actuating system as known to those of skill in the art.

According to yet another embodiment, the mirror 58 may be replaced with a solar panel (e.g., an array of photovoltaic cells) attached directly to the light tracking device, as opposed to being located at a remote target position. In this example, the half-angle rotation mechanism described above for the mirror may not be necessary. When the sensor array 52 is aligned with the sun, the solar panel may also be aligned with the sun and may receive maximum light available. This arrangement may be particularly useful for portable applications of the light tracking device where is may be preferable to have a system that is self-contained rather than having the light tracking device and a remote target (solar panel) as separate entities.

Having thus described various illustrative embodiments and aspects thereof, modifications and alterations may be apparent to those of skill in the art. Such modifications and alterations are intended to be included in this disclosure, which is for the purpose of illustration only, and is not intended to be limiting. Furthermore, it is to be appreciated that the above discussion referred in the most part to a single axis of alignment of the light tracking device, but that the discussion applied equally to both axes of alignment, each of which may have appropriate associated circuitry, sensors, motor, etc. It is also to be understood that although the invention is primarily described in terms of tracking the sun, the invention is not so limited, and may be used to track other celestial bodies, or other remote, bright light sources. The scope of the invention should be determined from proper construction of the appended claims, and their equivalents.

What is claimed is:

1. An autonomous light tracking device comprising:
    a first, movable light-sensitive sensor that produces a first electrical signal representative of light received from a remote light source;
    a second, movable light-sensitive sensor that produces a second electrical signal representative of light received from the remote light source;
    a first comparator that receives the first and second electrical signals and adapted to provide a first output signal when the first electrical signal differs substantially from the second electrical signal in a predetermined manner;
    a prime mover coupled to the first and second movable light-sensitive sensors, that selectively moves the first and second movable light-sensitive sensors in response to the first output signal so as to maintain the first and second movable light-sensitive sensors in approximate relative alignment with the remote light source over a substantial angular range of motion; and
    a power supply for the first comparator and the prime mover, that generates required electrical power for the prime mover from the remote light source by storing energy received from at least one photovoltaic cell and providing power to the prime mover only when a predetermined amount of energy has been stored, such that the prime mover exhibits intermittent motion.

2. The autonomous light tracking device as claimed in claim 1, wherein the remote light source is a celestial body.

3. The autonomous light tracking device as claimed in claim 1, further comprising a barrier constructed to cast a shadow on at least one of the first and second movable light-sensitive sensors when the light tracking device is not in alignment with the remote light source, such that the first electrical signal differs substantially from the second electrical signal in the predetermined manner.

4. The autonomous light tracking device as claimed in claim 3, wherein the barrier is substantially T-shaped.

5. The autonomous light tracking device as claimed in claim 3, wherein an amplitude of the first electrical signal is substantially different from an amplitude of the second electrical signal when a more extensive shadow is cast upon the first, movable light-sensitive sensor.

6. The autonomous light tracking device as claimed in claim 1, wherein each of the first and second movable light-sensitive sensors has a limited field of view such that the first electrical signal differs substantially from the second electrical signal in the predetermined manner when the light tracking device is not in approximate alignment with the remote light source.

7. The autonomous light tracking device as claimed in claim 1, wherein the photovoltaic cell further comprises a solar panel positioned to receive light from the remote light source, wherein the prime mover is coupled to move the solar panel to maintain the solar panel in approximate relative alignment with the remote light source, movement of the solar panel being coupled to movement of the first and second movable light-sensitive sensors.

8. The autonomous light tracking device as claimed in claim 1, further including a movable mirror positioned to reflect light received from the remote light source onto a target, wherein the prime mover is further adapted to move the movable mirror, movement of the mirror being coupled to movement of the first and second movable light-sensitive sensors.

9. The autonomous light tracking device as claimed in claim 8, wherein angular movement of the movable mirror occurs at a rate half that of a corresponding angular movement of the first and second movable light-sensitive sensors.

10. An autonomous light tracking device for tracking a position of the sun comprising:
a first, movable light-sensitive sensor that produces a first electrical signal representative of light received from the sun;
a second, movable light-sensitive sensor that produces a second electrical signal representative of light received from the sun;
a first comparator that receives the first and second electrical signals and adapted to provide a first output signal when the first electrical signal differs substantially from the second electrical signal in a predetermined manner;
first and second fixed sensors each adapted to be positioned so as to point towards a respective first and second horizon, and each adapted to produce respective third and fourth electrical signals representative of light received from the sun;
a second comparator, electrically coupled to the first fixed sensor and second moveable sensor, adapted to produce a second output signal when the third electrical signal differs substantially from the second electrical signal in a defined manner;
a third comparator, electrically coupled to the second fixed sensors and first moveable sensor, adapted to produce a third output signal when the fourth electrical signal differs substantially from the first electrical signal in a defined manner;
a prime mover coupled to the first and second movable light-sensitive sensors, that selectively moves the first and second movable light-sensitive sensors in response to the first output signal so as to maintain the first and second movable light-sensitive sensors in approximate relative alignment with the sun over a substantial angular range of motion of the sun; and
a power supply for the first comparator and the prime mover, that generates substantially all required electrical power for the prime mover from the sun; and
wherein the prime mover is controlled by the second and third output signals regardless of the first output signal, when the first and second movable sensors are not in approximate alignment with the sun, including, but not limited to, sunrise.

11. An autonomous light tracking device constructed to track a position of a sun and to receive operating power from the sun, the autonomous light tracking device comprising:
a plurality of light-sensitive sensors adapted to receive light from the sun;
control circuitry, coupled to the plurality of light-sensitive sensors, adapted to generate a control signal representative of light received by at least some of the plurality of light-sensitive sensors;
a moving mechanism that moves at least a movable part of the light tracking device to maintain at least the movable part of the light tracking device in alignment with the sun;
means for actuating the moving mechanism in response to the control signal; and
at least one photovoltaic cell coupled to the means for actuating the moving mechanism, the at least one photovoltaic cell being adapted to receive light from the sun and provide operating power to the means for actuating the moving mechanism;
wherein the means for actuating the moving mechanism is adapted to store energy received from the at least one photovoltaic cell and to allow the moving mechanism to move when a predetermined amount of energy has been stored, such that the moving mechanism exhibits intermittent motion.

12. A The autonomous light tracking device as claimed in claim 11, wherein the movable part of the light tracking device includes a mirror and at least some of the plurality of light-sensitive sensors, and wherein movement of the mirror is coupled to movement of the at least some of the plurality of light-sensitive sensors such that the mirror is maintained in approximate alignment with the sun during a substantial interval of daylight.

13. The autonomous light tracking device as claimed in claim 12, wherein the movable part of the light tracking device further includes the at least one photovoltaic cell.

14. A method for providing solar energy to a target comprising acts of:
receiving light from the sun with a plurality of light-sensitive sensors each adapted to generate an output signal representative of an amount of light received;
generating a control signal based on a comparison of the output signals provided by the plurality of light-sensitive sensors;
moving at least two movable ones of the plurality of light-sensitive sensors in response to the control signal to maintain the at least two movable light-sensitive sensors in approximate relative alignment with the sun;

moving a mirror in response to the control signal to maintain the mirror in approximate alignment with the sun and with the target so that light from the sun is reflected by the mirror to the target, thereby providing the solar energy to the target;

converting light received from the sun with at least one photovoltaic cell to operating power for performing the moving acts;

said act of generating a control signal including comparing a first electrical signal generated by a first movable one of the plurality of light-sensitive sensors with a second electrical signal generated by a second movable one of the plurality of light-sensitive sensors, and generating a first control signal based on a difference between the first and second output signals, comparing a third electrical signal generated by a first fixed one of the plurality of light-sensitive sensors with the second electrical signal generated by the second movable one of the plurality of light-sensitive sensors, and generating the control signal based on a difference between the third and second electrical signals, regardless of the first control signal.

15. The method as claimed in claim 14, wherein the act of generating the control signal includes comparing a fourth electrical signal generated by a second fixed one of the plurality of light-sensitive sensors with the first electrical signal generated by the first movable one of the plurality of light-sensitive sensors, and generating the control signal based on a difference between the fourth and first electrical signals, regardless of the first control signal.

16. The method as claimed in claim 14, wherein the acts of moving include an act of actuating a moving mechanism coupled to the at least two movable light-sensitive sensors and to the mirror.

17. The method as claimed in claim 16, wherein the act of converting includes storing energy received from the at least one photovoltaic cell and wherein the act of actuating includes actuating the moving mechanism to move when a predetermined amount of energy has been stored, such that the moving mechanism exhibits intermittent motion.

18. An apparatus comprising:

an electric motor;

control circuitry coupled to the electric motor;

at least one photovoltaic cell coupled to the control circuitry and adapted to receive light from a remote source and provide operating power to the control circuitry;

a plurality of light-sensitive sensors adapted to receive light from the remote source;

control circuitry, coupled to the plurality of light-sensitive sensors, adapted to generate a control signal representative of light received by at least some of the plurality of light-sensitive sensors; and wherein the control circuitry is adapted to store energy received from the at least one photovoltaic cell and to allow the electric motor to move when a predetermined amount of energy has been stored, such that the electric motor exhibits intermittent motion, and further, wherein the control circuitry receives a control signal from the comparator circuitry and actuates the electric motor responsive to the control signal, with said intermittent motion, to maintain the plurality of light-sensitive sensors and the at least one photovoltaic cell in a tracking relationship with the remote source.

* * * * *